G. E. M. GUY-BERNARD DE SALABERRY.
THRESHING MACHINE.
APPLICATION FILED JUNE 23, 1910.
1,075,416.
Patented Oct. 14, 1913.
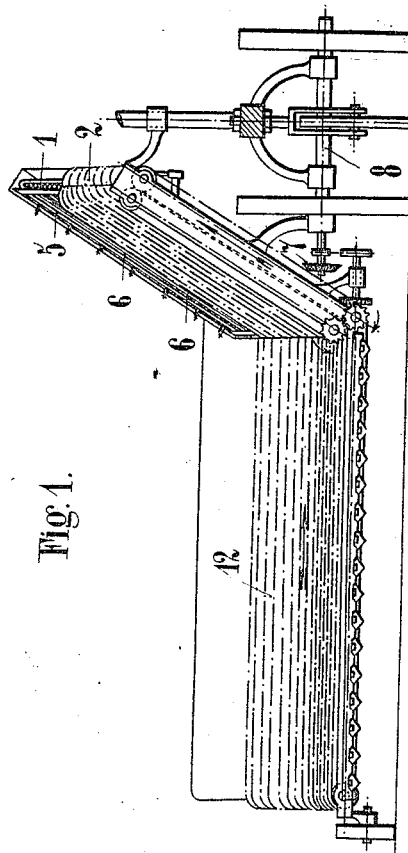
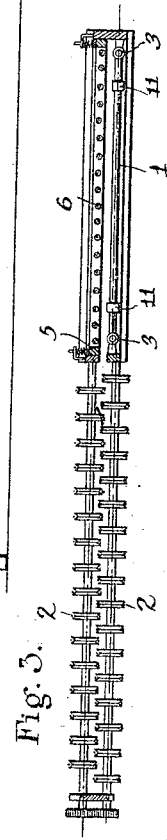
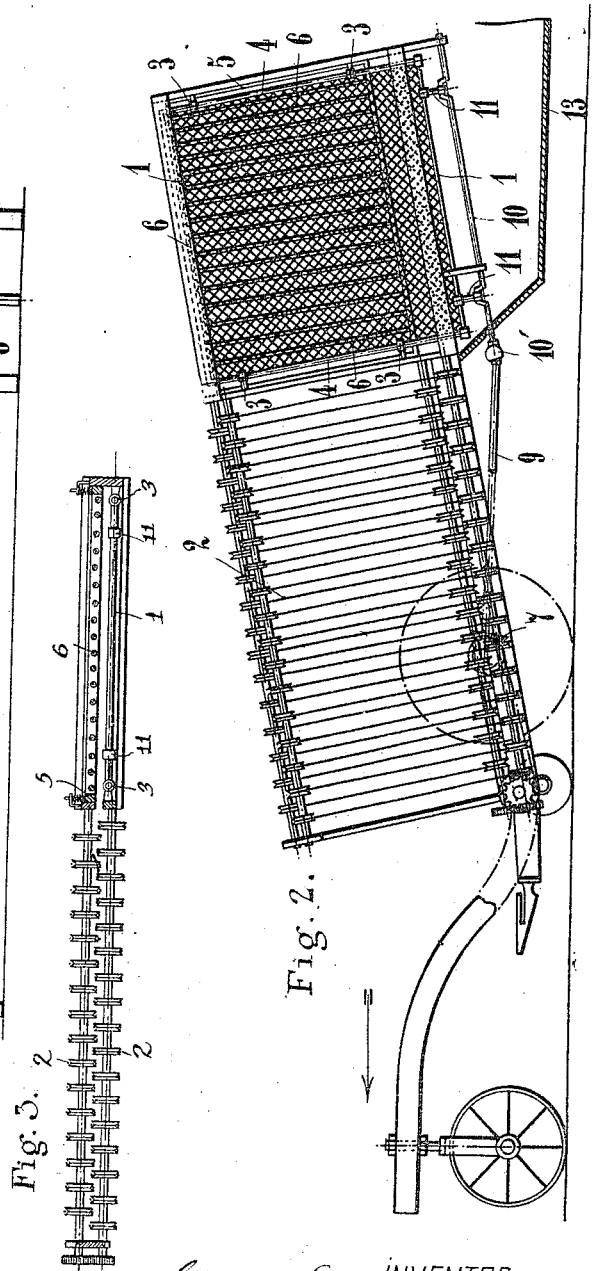
WITNESSES:
John Murtagh
L. J. Murphy
INVENTOR
Georges Erhard Marie
Guy-Bernard Comte de Salaberry
BY
ATTORNEYS.

UNITED STATES PATENT OFFICE.

GEORGES ERHARD MARIE GUY-BERNARD DE SALABERRY, OF FOSSÉ, FRANCE.

THRESHING-MACHINE.

1,075,416.

Specification of Letters Patent.

Patented Oct. 14, 1913.

Application filed June 23, 1910. Serial No. 568,430.

*To all whom it may concern:*

Be it known that I, GEORGES ERHARD MARIE GUY-BERNARD, DE SALABERRY, a citizen of the Republic of France, residing in Fossé, in said Republic, have invented new and useful Improvements in Threshing-Machines, which improvements are fully set forth in the following specification.

This invention relates to an improvement on the agricultural machine for separating the grains and stalks of cereals immediately after cutting, in which a comb or combs produce the traction necessary for separating the grains and the straw by the passage of the stalks between series of chains, cables or endless belts so arranged that they exert on the stalks throughout their length or a portion thereof, while conducting the same, not only a pressure, but also a slight wedging and folding action.

The improvement forming the object of the present invention consists in replacing the comb by a shelling device, which may at the same time perform the function of a threshing device, formed by an open-work frame reciprocating against another frame formed of rods, the ends of the stalks which carry the spikes entering between both frames. The frame formed of rods may be stationary or have a reciprocating or hammering motion imparted thereto.

The accompanying drawings illustrate by way of example a structural form of the machine provided with the shelling or threshing device.

Figure 1 is a front elevation. Fig. 2 is a side elevation. Fig. 3 represents a pair of the spaced lateral reciprocating frames constituting the threshing device.

The threshing device comprises an open-work frame 1 of a suitable size, formed with an outer frame on which is stretched a grating or perforated metal sheet or on which are arranged wooden or metallic bars. This frame, placed at the rear of the tractor device 2 and in the longitudinal middle plane of the latter, is held between slides 3 in which the frame standards may slide through a mechanical transmission which will be referred to hereafter. Against the frame 1 is arranged another frame 5 formed with a rim on which the rods 6 are secured. In the example shown, the frame 5 is stationary.

As the mechanical devices transmitting the lateral reciprocating motion to the frame 1 may be varied, the following device is only indicated by way of example. A set of bevel gears 7 transmits the motion of axle 8 to a longitudinal shaft 9 connected by a universal joint 10' to a crank-shaft 10 arranged parallel to the lower edge of frame 1, which is connected by links 11 to said shaft. Under these conditions when the cut-stalks carried along by the conveyer 12 arrive at the bottom of the tractor device and are caught by the chains, cables or endless belts which constitute the aprons of this system, they enter at the same time, with their ends carrying the spikes, between the frames 1 and 5, at which moment the shelling or threshing is produced by the traction exerted on the stalks engaged between the series of chains, cables or belts, and by the resistance offered by the two frames pressed by suitable springs. Obviously this shelling or threshing is further facilitated by the reciprocating motion of frame 1 which results in a sort of traction exerted on the grains, the stalks, on the other hand, being held and drawn by the tractor device. With this tractor device, the stalks always rise toward the upper part of the device while the threshing proceeds gradually. The grains and the bundle pass through the perforated frame 1 and drop into the receptacle 13. The straw escapes from the threshing device at the same time as it leaves the tractor device, through the upper part, either to drop onto the ground or to be collected by a binder, which may eventually be combined with the threshing machine.

Finally the motion imparted to the frame 5, in the detail of its rods or as a whole may, through suitable springs exerting a constant pressure, be so combined that when falling back, it produces on the spikes a hammering action which is also intended to promote the threshing.

I claim:

In a threshing machine, the combination of a machine frame, an inclined stationary frame supported on the rear part of machine frame and having rods supported thereon, a reciprocating frame slidably mounted in the machine frame in close proximity to the stationary frame and movable in a plane parallel thereto, gratings on said reciprocating frame, upper and lower pairs of inclined parallel shafts journaled in the end of said stationary and reciprocating frames, means for turning the lower shafts in opposite directions, pulleys on said shafts, belts passed over the pulleys of corresponding shafts of each pair, a conveyer terminating near the lower shaft, a crank-shaft below the reciprocating frame, links connecting the crank-shaft and said reciprocating frame, and means for rotating the crank-shaft.

In testimony whereof I have signed this specification in the presence of two subscribing witnesses.

GEORGES ERHARD MARIE GUY-BERNARD COMTE DE SALABERRY.

Witnesses:
EMILE LEDRET,
DEAN B. MASON.